(12) United States Patent
Keller et al.

(10) Patent No.: US 6,463,730 B1
(45) Date of Patent: Oct. 15, 2002

(54) VALVE CONTROL LOGIC FOR GAS TURBINE RECUPERATOR

(75) Inventors: Timothy J. Keller, Albuquerque, NM (US); Daniel Burns, Phoenix, AZ (US); Mohamad Hanif Vhora, Albuquerque, NM (US); Patrick O'Brien, Albuquerque, NM (US); Coung Van Nguyen, Redondo Beach, CA (US)

(73) Assignee: Honeywell Power Systems Inc., Morristown, NJ (US)

( * ) Notice: Subject to any disclaimer, the term of this patent is extended or adjusted under 35 U.S.C. 154(b) by 0 days.

(21) Appl. No.: 09/614,301

(22) Filed: Jul. 12, 2000

(51) Int. Cl.$^7$ .................................................. F02C 7/10
(52) U.S. Cl. ..................................... 60/39.24; 60/39.511
(58) Field of Search .......................... 60/39.24, 39.511, 60/39.512, 39.27, 795

(56) References Cited

U.S. PATENT DOCUMENTS

| | | | |
|---|---|---|---|
| 2,914,917 A | * | 12/1959 | Van Nest ................. 60/39.511 |
| 3,630,022 A | | 12/1971 | Jubb |
| 3,699,681 A | | 10/1972 | Frutschi |
| 3,724,206 A | | 4/1973 | Ross |
| 3,742,702 A | * | 7/1973 | Quinn ..................... 60/39.511 |
| 3,978,658 A | * | 9/1976 | Forbes et al. ............. 60/39.27 |
| 3,986,347 A | * | 10/1976 | Schirmer ................. 60/39.511 |
| 4,299,088 A | * | 11/1981 | Rowen et al. ............. 60/39.27 |
| 4,327,294 A | | 4/1982 | Smith et al. |
| 4,432,201 A | | 2/1984 | Hawes |
| 4,470,118 A | | 9/1984 | Morrison |
| 4,532,763 A | | 8/1985 | Pisano |
| 4,543,782 A | | 10/1985 | Fitzmaurice |
| 4,603,546 A | | 8/1986 | Collins |
| 4,655,034 A | | 4/1987 | Kenison et al. |
| 4,754,607 A | | 7/1988 | Mackay |
| 4,761,957 A | | 8/1988 | Eberhardt et al. |
| 4,991,389 A | | 2/1991 | Schafer |
| 5,274,996 A | | 1/1994 | Goff et al. |
| 5,323,603 A | | 6/1994 | Malohn |
| 5,385,012 A | | 1/1995 | Rowe |
| 5,396,760 A | | 3/1995 | Hines |
| 5,537,864 A | * | 7/1996 | Sood ........................ 60/39.27 |
| 5,636,512 A | | 6/1997 | Culver |
| 5,732,546 A | | 3/1998 | Pineo et al. |
| 5,778,675 A | | 7/1998 | Nakhamkin |
| 5,855,112 A | | 1/1999 | Bannai et al. |
| 5,879,133 A | | 3/1999 | Mirsky et al. |
| 6,062,016 A | | 5/2000 | Edelman |

FOREIGN PATENT DOCUMENTS

| | | |
|---|---|---|
| BE | 768875 A | 11/1971 |
| EP | 0274341 | 7/1988 |

* cited by examiner

Primary Examiner—Louis J. Casaregola
(74) Attorney, Agent, or Firm—Robert Desmond, Esq.

(57) ABSTRACT

Control logic and a method for controlling turbine speed. In an embodiment, the inventive control logic controls turbine speed of turbine generators operating in a stand-alone mode and/or a grid mode.

6 Claims, 6 Drawing Sheets

VALVE CONTROL LOGIC FOR GAS TURBINE RECUPERATOR

BACKGROUND OF THE INVENTION

1. Field of the Invention (Technical Field)

The present invention relates to control logic speed control of turbine systems.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Turbine engines such as microturbines or "turbogenerators" typically comprise three main sections: a compressor, a combustor, and a power turbine. In general, compressed air is mixed with fuel and burned under constant pressure conditions to produce a hot gas that expands through a turbine to perform work. A portion of the work compresses air while the remaining portion is available for other use, e.g., mechanical drive, electrical generation, etc. Electrical generation is achieved, for example, through use of a shaft mounted in a permanent magnet/stator assembly.

Some turbine power generators are fitted with a recuperator, which recuperates heat from exhaust gas exiting the power turbine. The recuperated heat is often used to pre-heat compressed air prior to combustion. By recovering heat from the exhaust gas and putting it back into the system prior to the combuster, less fuel is needed to sustain a given turbine operating temperature.

Often a recuperated turbine power generator has two distinct modes of operation: normal mode and bypass mode, in which compressor air is directed from an inlet duct to an outlet duct without entering the recuperator. In by-pass mode, exhaust heat does not pre-heat compressed air prior to combustion. In by-pass mode, a turbine generator may still achieve full power, but at a higher fuel consumption when compared to normal mode operation. In by-pass mode, the temperature of the recuperator rises as long as no fluid and/or gas are available in cold-side passages of the recuperator to receive heat from the exhaust gas passing through the hot-side passages of the recuperator. Bypass also comprises bypassing the recuperator and the turbine, for example, a recuperator and turbine bypass valve may direct a fraction of the total air away from the recuperator and turbine. Where the recuperator and turbine are bypassed or partially bypassed, the overall effect is to load down the turbine.

For recuperated turbine electrical generators, turbine speed depends on load and operational mode, e.g., normal and recuperator by-pass modes. For example, if a large load is dropped quickly, then turbine speed increases rapidly, which may harm the generator absent an overspeed cut-off. If a large load is dropped slowly, then turbine speed may be uncontrollable for several minutes until, for example, the recuperator cools down. Alternatively, or in combination with overspeed, overvoltage may occur in electrical generators. Of course, in mechanical generators, at least one condition analogous to overvoltage may occur, which may be potentially detrimental.

The following patent discloses use of a valve system for controlling turbine operation.

U.S. Pat. No. 4,761,957, entitled "Indirectly Heated Gas Turbine Engine," to Eberhardt et al., issued Aug. 9, 1988 ('957 Patent), discloses a three valve system for controlling turbine operation: (i) a modulating bypass trim valve to control hot gas flow to the turbine; (ii) another modulating valve to control pressure drop for efficient control of the turbine; and (iii) a dump valve or surge control valve in the event of rapid engine decelerations where the pressure of the air in the recuperator is higher than the output of the compressor. The '957 Patent also discloses use of a compressor bleed valve during start-up to prevent surge, choke and stall.

A need exists for better methods to control all types of turbine power generators.

SUMMARY OF THE INVENTION (DISCLOSURE OF THE INVENTION)

In one embodiment, the present invention comprises control logic for controlling a turbine in response to a change in load. A change in load comprises, for example, but is not limited to, a turbine user scheduled change, an unexpected load change, and/or a demand load change that is unexpected, scheduled, and/or otherwise. Of course, in some instances, for example, but not limited to, in an emergency shut down situation, the control may not necessarily be implemented in response to a change in load. In other instances, some other condition may activate and/or reset control. In one embodiment, the inventive control logic comprises at least one input for inputting at least one turbine parameter and at least one circuit for comparing the at least one turbine parameter to at least one turbine control criterion wherein the at least one turbine control criterion comprises a member selected from the group consisting of activation criteria and reset criteria and wherein the at least one circuit outputs a control signal. A turbine parameter comprises a parameter related to the operation of a turbine; therefore, a turbine parameter comprises, for example, but is not limited to, parameters such as: gas flow, mass, pressure, volume, temperature, composition, and concentration; compressor speed and acceleration; turbine speed and acceleration; rotor speed and acceleration; fuel flow, mass, volume, composition, concentration, temperature, pressure, and energy value (e.g., btu); bearing parameters; shaft parameters; load and/or unload parameters; equipment temperature; an event; a time; number of events; a duration of time; and the like. A turbine parameter optionally comprises a derivative of another turbine parameter, for example, acceleration comprises the time derivative of speed. Of course other derivatives based on distance, other measures and/or parameters are within the scope of the present invention. The invention, however, is not limited to derivatives that are input as turbine parameters because according to the present invention, logic comprising a circuit for determining a derivative is within the scope of the present invention. Again, such a derivative optionally comprises derivatives based on time, distance, other measures and/or parameters and are within the scope of the present invention.

According to this embodiment, a turbine control criterion comprises a criterion related to operation of a turbine, including, for example, a criterion related to a turbine parameter. In such an embodiment of the inventive control logic, for example, but not limited to, a criterion functions as an activation criterion and/or reset criterion. In one embodiment, an activation criterion comprising an unload criterion is used. In another embodiment, a reset criterion comprising a time, a time delay and/or event is used. Of course embodiments comprising both are within the scope of the present invention. Therefore, according to such an embodiment of the present invention, an activation criterion controls activation and a time and/or event controls reset. In such an embodiment, the invention control optionally comprises a timer and/or event counter wherein activation and/or a turbine parameter optionally interact with the timer and/or event counter.

In an embodiment of the present invention, the control logic outputs a control signal that comprises a valve control signal. In such an embodiment, the valve control signal optionally controls a bypass valve. According to the present invention, a bypass valve operates to bypass gas from one section of a turbine generator to the environment and/or to another section of a turbine generator. For example, but not limited to, bypass of gas from a compressor; before a turbine; before a recuperator; from a turbine; from a recuperator; from a compressor and before a combuster; before a combuster; after a combuster; and the like. In an embodiment where comprising bypass of gas from a compressor, the bypass optionally comprises means to bypass at least 1% of the total gas flow from the compressor. In such an embodiment, the gas flow bypass optionally ranges from approximately 0% to approximately 100%, preferably from approximately 1% to approximately 50% and most preferably from approximately 1% to approximately 25%. In one embodiment, a bypass valve bypasses approximately 15% of the gas flow from the compressor, when activated and approximately 0% when reset. While a valve is suitable, other means of bypass are within the scope of the present invention.

In one embodiment, the present invention comprises control logic for controlling a turbine comprising at least one input for inputting a turbine speed value, a turbine speed set-point criterion, a speed activation criterion, a speed reset criterion, an turbine acceleration load criterion, and an turbine acceleration unload criterion; and at least one circuit for determining a speed error value from the turbine speed value and the turbine speed set-point and a turbine acceleration value from the turbine speed value and for comparing the turbine acceleration value to the turbine acceleration load criterion, the turbine acceleration value to the turbine acceleration unload criterion, the speed error value to the speed activation criterion and the speed error value to the speed reset criterion wherein the at least one circuit outputs a control signal. This embodiment is optionally useful for turbine generators operated in stand-alone mode.

In one embodiment, the present invention comprises control logic for controlling a turbine comprising: at least one input for inputting a turbine speed value, a turbine speed set-point criterion, a speed activation criterion, and a speed reset criterion; and at least one circuit for determining a speed error value from the turbine speed value and the turbine speed set-point and for comparing the speed error value to the speed activation criterion and the speed error value to the speed reset criterion wherein the at least one circuit outputs a control signal. This embodiment is optionally useful for turbine generators operated in grid mode.

The present invention also comprises an inventive method for controlling a turbine. In one embodiment, the inventive method for controlling a turbine in response to a change in load comprises the steps of: inputting at least one turbine parameter; comparing the at least one turbine parameter to at least one turbine control criterion wherein the at least one turbine control criterion comprises a member selected from the group consisting of activation criteria and reset criteria; and outputting a control signal based on the comparing step. The method optionally comprises use of an activation criterion comprising an unload criterion; use of a reset criterion selected from the group consisting of time, time delay and event; and/or combinations thereof. In one embodiment, the method comprises outputting a valve control signal, for example, to a bypass valve wherein the bypass valve causes, for example, bypass of at least 1% of the total gas flow from a compressor. The method optionally routes the gas back to the turbine generator and/or dumps it to the environment and/or other sink.

The inventive method optionally comprises at least one turbine parameter that comprises a derivative of another turbine parameter, such as, but not limited to, a time derivative. The inventive method optionally comprises at least one circuit that further comprises a circuit for determining a derivative of a turbine parameter, such as, but not limited to, a time derivative.

The invention also comprises a method for controlling a turbine comprising the steps of: inputting a turbine speed value, a turbine speed set-point criterion, a speed activation criterion, a speed reset criterion, a turbine acceleration load criterion, and a turbine acceleration unload criterion; determining a speed error value from the turbine speed value and the turbine speed set-point and a turbine acceleration value from the turbine speed value; comparing the turbine acceleration value to the turbine acceleration load criterion, the turbine acceleration value to the turbine acceleration unload criterion, the speed error value to the speed activation criterion and the speed error value to the speed reset criterion; and outputting a control signal based on the comparing step. This method is optionally useful for controlling a turbine in a stand-alone mode.

The invention also comprises a method of controlling a turbine comprising the steps of: inputting a turbine speed value, a turbine speed set-point criterion, a speed activation criterion, and a speed reset criterion; determining a speed error value from the turbine speed value and the turbine speed set-point; comparing the speed error value to the speed activation criterion and the speed error value to the speed reset criterion; and outputting a control signal based on the comparing step. This method is optionally useful for controlling a turbine in a grid mode.

The invention also comprises inventive control logic for controlling a turbine, for example, but not limited to, control in response to a change in load comprising: means for inputting at least one turbine parameter; and means for comparing the at least one turbine parameter to at least one turbine control criterion wherein the at least one turbine control criterion comprises a member selected from the group consisting of activation criteria and reset criteria and wherein the at least one circuit outputs a control signal. Means for inputting optionally comprises digital and/or analog devices, fluid and/or gas devices, pressure and/or temperature sensitive devices, software driven devices, electromagnetic devices, electrical devices and/or mechanical devices. Means for comparing optionally comprises digital and/or analog devices, fluid and/or gas devices, pressure and/or temperature sensitive devices, software driven devices, electromagnetic devices, electrical devices and/or mechanical devices. One of ordinary skill in the art of control systems would understand how to configure such input means and comparing means based on the aforementioned and other devices.

A primary object of the present invention is to control turbine speed.

A primary advantage of the;:present invention is effective control of turbine speed.

A secondary advantage of the present invention is optional use of a low cost on/off valve.

Other objects, advantages and novel features, and further scope of applicability of the present invention will be set forth in part in the detailed description to follow, taken in conjunction with the accompanying drawings, and will become apparent to those skilled in the art upon examination of the following, and/or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. In the drawings.

DESCRIPTION OF SEVERAL EMBODIMENTS

The present invention comprises an inventive control logic and method for controlling turbines, for example, but not limited to, turbine generators. According to an embodiment of the present invention, turbine control is effectuated through control of energy in a turbine system. For example, but not limited to, energy is optionally controlled through release and/or redirection of gas, and/or through fuel supply, which optionally includes gas. According to the present invention, one method of releasing energy from a turbine comprises releasing gas from a compressor wherein the released gas bypasses other components of a turbine system, such as, but not limited to, a turbine, a recuperator, a combustor, and the like. In an embodiment of the present invention, this is optionally achieved through use of a bypass valve that is controlled via control logic. In an embodiment, an output signal activates a valve that, for example, allows approximately 0% to approximately 100% of the gas from the compressor to bypass other components and, for example, vent to the environment and/or other sink. In another embodiment, the valve allows approximately 1% to approximately 50% of the gas to bypass and/or vent when activated; while in yet another embodiment, the valve allows approximately 1% to approximately 25% of the gas to bypass and/or vent when activated. According to such embodiments, upon reset, the valve allows approximately 0% of the gas to bypass and/or vent. The percentage of gas allowed to bypass and/or vent is optionally fixed and/or variable. In general, bypass (which as used herein includes venting) causes a release of energy from the system and therefore acts as a load upon a turbine generator. According to an embodiment of the present invention, more energy is released at higher turbine speed for a set valve opening. Therefore, in such an embodiment, the energy released is related to turbine speed. This method of release of energy is particularly useful for turbine systems where fuel control at low flows is impractical or impossible.

While release of energy by bypass has been described herein, the present invention is not limited to this method of energy release. The present invention optionally comprises bypass and/or other energy release methods. Other energy release methods include, but are not limited to, counter loads (e.g., resistive), valves positioned at other points on a turbine generator, and the like. Of course, alternatives to valves are within the scope of the present invention.

In an embodiment of the present invention, the control logic controls a recuperated turbine generator. In a typical recuperated generator, air enters a compressor at near ambient conditions. The compressor boosts the pressure and temperature of the inlet air. Next, the air passes through a recuperator, which is essentially a heat exchanger that transfers, for example, exhaust heat to pre-combuster gas, which normally increases the temperature of the gas. The high pressure gas then enters a combuster wherein it is typically mixed with a fuel and combusted. The combusted gas passes through a turbine that has a discharge or exhaust near ambient pressure. This exhaust gas passes through the recuperator to heat the pre-combuster gas and is then discharged to the environment. Of course many modifications exist, such as multiple components, turbines, compressors, etc. Control of such modified systems is within the scope of the present invention.

The present invention represents a significant improvement over the prior art for control of turbine generators. For example, according to an embodiment, the present invention comprises a single low temperature, non-modulating, low cost valve. In an embodiment, this valve comprises a recuperator and turbine bypass valve and/or partial bypass valve wherein, for example, all or a fraction of the total air is directed away from the recuperator and turbine. Where the recuperator and turbine are bypassed or partially bypassed, the overall effect is to load down the turbine. In this particular embodiment, the single air bypass valve places a load on the compressor, thereby preventing turbine speed runaway under a large load drop. This single valve serves the function of the '957 Patent's high-temperature turbine dump valve. The single valve of this embodiment of the present invention also serves the purpose of the '957 Patent's dump valve for surge control; however, this function is not needed for some generators. In an embodiment of the present invention, a single air bypass prevents surge during start-up—compare to the '957 Patent's compressor bleed valve. Again, this function is not needed for some generators. Prior art systems, like that disclosed by the '957 Patent, focus on overspeed eradication. In an embodiment of the present invention, at least one valve is used for speed control, not solely overspeed eradication. For example, given a turbine generator connected to a power grid, the inventive apparatus controls speed with a bypass valve, in the event of a large generator unload, and allows the recuperator to cool down at a maximum cooling rate. By keeping the turbine speed above a speed set point, a fuel control schedules the minimum possible fuel flow.

The present invention meets the need for better speed control of turbine generator systems. For example, according to an embodiment, inventive bypass control logic operable in a variety of modes, including, but not limited to, Stand Alone Mode ("SAM") and Grid Mode ("GM"). SAM refers to a turbine generator operating as the sole power supply source; whereas, GM refers to a turbine generator operating in conjunction with at least one additional power source. For electrical generators, the additional power source may comprise a power grid, for example, a commercial power grid. Or, as another example, the power source may comprise a local power plant isolated from a commercial power grid. Of course, hybrid GM/SAM operation is possible as is operation of more than one turbine generator operable in at least one mode.

According to an embodiment, control logic for SAM comprises "Ndot" and variable speed set point-reset control. The term "Ndot" refers to the rate of change of the speed of the turbine, in other words, the change in speed divided by the change in time. In this embodiment, control logic activates and resets in response to the size of a load change. For example, Ndot and the load change are used to determine if overspeed or overvoltage may occur, in the case of an electrical generator. Again, while this embodiment is useful for electrical generators, the present invention is not limited to control of electrical generators. According to this embodiment, activation refers to activating at least one recuperator and turbine bypass valve and preferably only a single recuperator and turbine bypass valve. Of course, the present invention is not limited to activation of a valve, or solely a recuperator and turbine bypass valve, because other measures may be taken to effectuate speed control.

According to an embodiment, control for GM comprises logic that activates when turbine speed exceeds a scheduled speed and/or a set-point speed. This control logic optionally activates when turbine speed exceeds a constant window and/or a variable window about a scheduled speed and/or a set-point speed. A window preferably comprises a positive window above some desired operational turbine speed. In this particular embodiment, the logic relies solely on speed to determine activation. For example, if a large load is removed, and the fuel control cannot lower the fuel flow to the combustor due to potential combustor blow-out, then turbine speed may exceed a scheduled and/or set-point speed. Blow-out typically occurs due to lean fuel-combustion gas mixtures and is somewhat analogous to losing a pilot light. In this example, when the speed exceeds a scheduled, set-point, and/or windowed speed value, then a recuperator and turbine bypass valve is actuated. According to this example, the valve is reset when the speed is brought into compliance with a scheduled, set-point, and/or window value, which may vary over time. These schedules, set-point and/or window value need not match the value that triggered valve activation, in other words, for a variety of reasons, the activation speed value and the reset value need not coincide. Overall, according to this embodiment, a single on-off recuperator and turbine bypass valve has the effect of a modulating valve, which can control turbine speed. In an embodiment, the control logic of the present invention is particularly useful for recuperated turbine generators with low rotating inertia.

Figure 1:
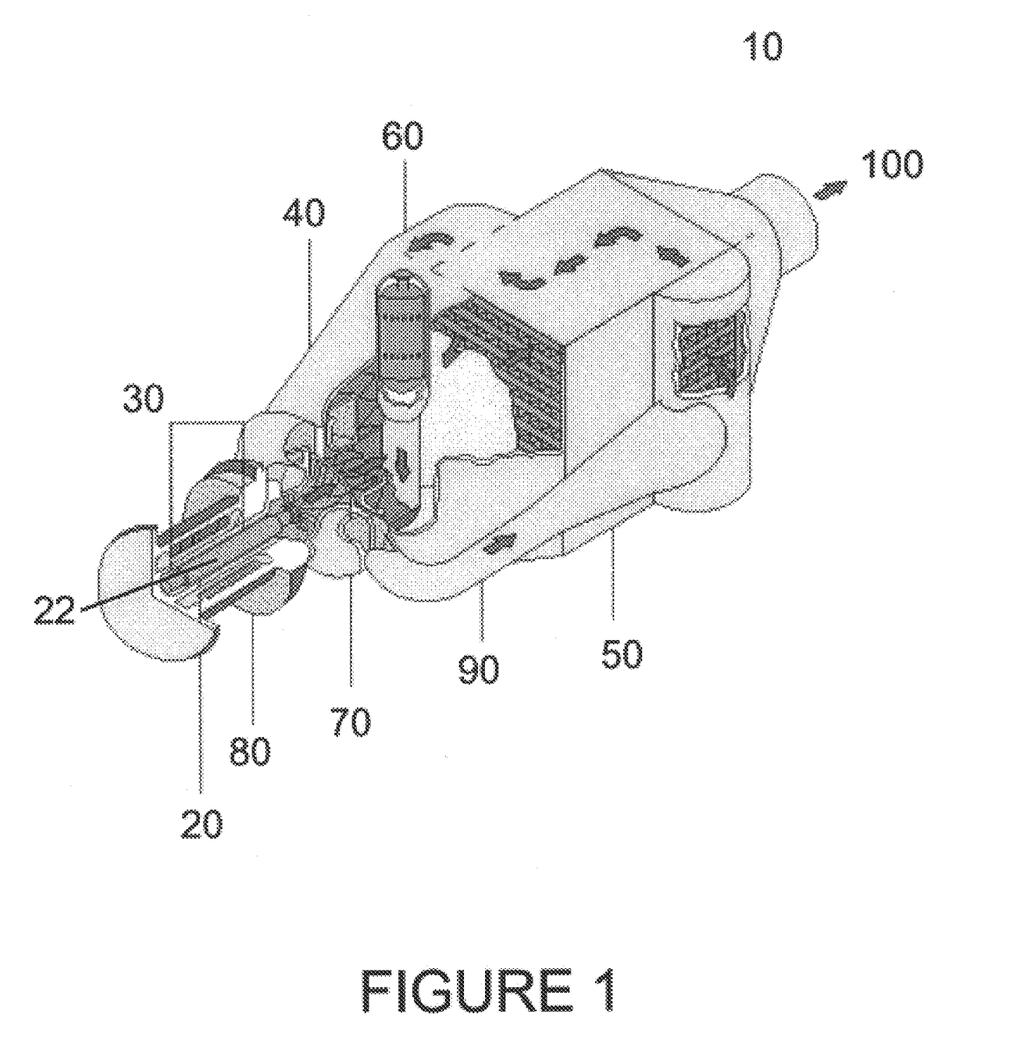
FIG. 1 is a diagram of a recuperated turbine generator.

Several embodiments of the present invention are set forth in more detail with reference to the drawings. Referring to FIG. 1, a turbine generator 10 for generating electrical power is shown. The turbine generator of FIG. 1 comprises a permanent magnet electrical generator 20 comprising a shaft 22 that is supported by air bearings 30. The shaft 22 rotates through a connection to a turbine wheel 40. The turbine wheel 40 operates as part of an assembly comprising a recuperator 50, a combustor 60, and a compressor wheel 70. The turbine generator further comprises an air inlet 80, a duct 90 and an exhaust 100. Further details of turbine generator components are shown in FIG. 2.

Figure 2:
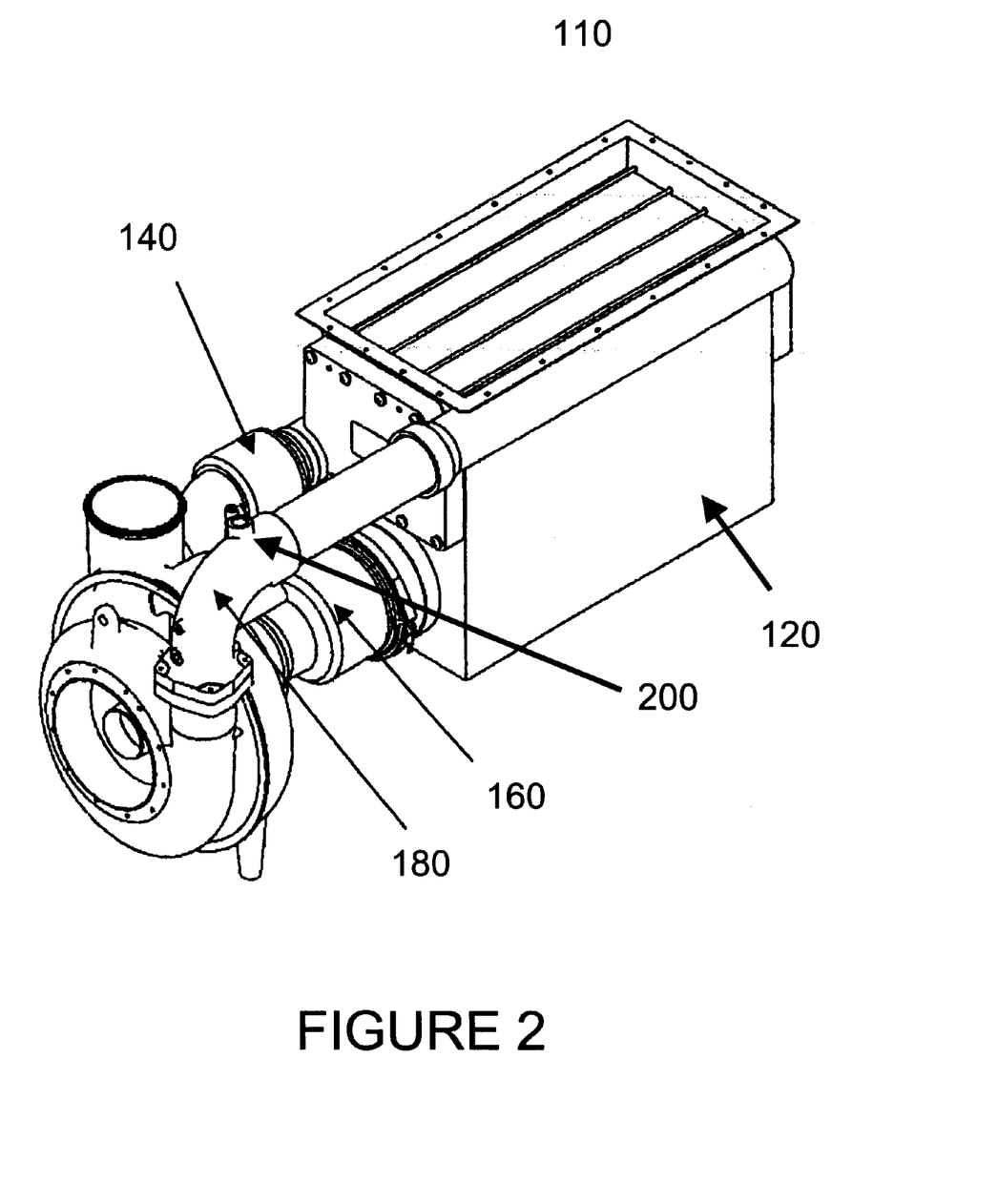
FIG. 2 is diagram of a duct system for a recuperated turbine generator.

Referring to FIG. 2, a ducting layout system 110 is shown. The system comprises a series of ducts, including a combustor turbine inlet duct 140, a diffuser 160 and a compressor discharge duct 180. A recuperator 120 is also shown. Of particular importance is a port for an air bypass valve 200. According to an embodiment of the present invention, control logic is used to activate a valve seated at this location. Logic used to control, for example, a valve seated at this location, is further described in FIGS. 3 and 4.

Figure 3:
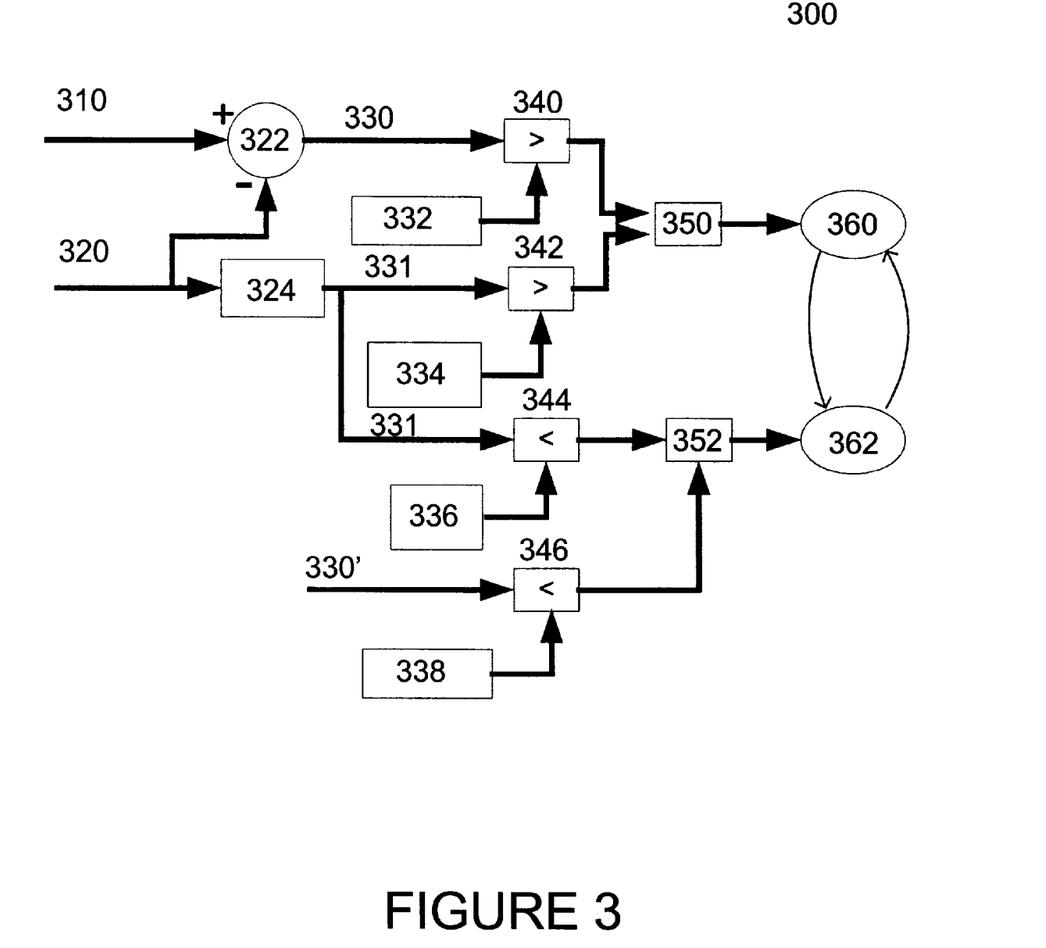
FIG. 3 is a control logic diagram according to an embodiment of the present invention.

Referring to FIG. 3, a control logic diagram for SAM operation 300 according to an embodiment of the present invention is shown. In this embodiment, inputs to the logic system comprise variable speed set-point 310 and turbine speed 320. As shown, Ndot 331 is determined on the basis of turbine speed 320 in a logic block labeled 324, of course a timing device or other device known to those of ordinary skill in the art is useful in determining Ndot on the basis of turbine speed. According to an embodiment of the present invention, Ndot represents turbine acceleration. Turbine speed error 330, 330' is determined on the basis of variable speed set-point 310 and turbine speed 320 in a logic block labeled 322. The speed error 330 is then compared to a speed activation value 332 in a block labeled 340. The speed activation value comprises a relative value and/or an absolute value. For example, but not limited to, the speed activation value optionally comprises a relative value that is added to another value, which may be variable with respect to time. In an embodiment, a relative speed activation value is referred to as a speed error limit. Ndot 331 is compared to, for example, a Ndot unload criterion 334, in logic block labeled 342, and/or a Ndot load criterion 336, in a logic block labeled 344. In this specific embodiment, speed error 330' is also compared to a speed reset value 338 in a logic block labeled 346. The speed reset value comprises a relative value and/or an absolute value, for example, but not limited to, the speed reset value optionally comprises a relative value that is added to another value, which may be variable with respect to time.

As described above and shown in FIG. 3, the inventive control logic comprises data sufficient to activate, for example, but not limited to, a recuperator and turbine bypass valve. Activation occurs when the speed error 330 equals and/or is greater than the speed activation value 332 and/or when Ndot 331 indicates a significant unload condition due to a Ndot unload criterion or criteria 334. If activation is warranted, an activation signal is output from the logic block labeled 340 and/or the logic block labeled 342. Output from either or both logic blocks 340, 342 enters a logic block labeled 350, wherein a control signal 360 is sent, for example, to a recuperator bypass valve. Upon receipt of such a control signal 360, the turbine generator enters, for example, full bypass mode. Operation in bypass mode tends to reduce turbine speed and/or overvoltage, in electrical generators.

As described above and shown in FIG. 3, the inventive control logic comprises data sufficient to close or reset, for example, but not limited to, a recuperator and turbine bypass valve. Reset occurs when the speed error 330' equals and/or is less than the speed reset limit 338 and/or when Ndot 331 indicates a significant load condition due to a Ndot load criterion or criteria 336. If reset is warranted, a reset signal is output from the logic block labeled 344 and/or the logic block labeled 346. Output from either or both logic blocks 344, 346 enters a logic block labeled 352, wherein a control signal 362 is sent, for example, to a recuperator and turbine bypass valve. Upon receipt of such a control signal 362, the turbine generator enters, for example, normal recuperator mode.

While the logic diagram shown in FIG. 3 comprises a variety of logic blocks, it is understood that all functions are optionally performed by a single circuit comprising the same or substantially similar logic to achieve the same and/or substantially similar control. Such alternatives are within the scope of the present invention.

In an embodiment, the inventive control logic relies primarily on Ndot control. In implementing Ndot control, the Ndot activation criterion is preferably set to activate on unloads that are large enough to cause potential overspeed trip problems. The control logic is also optionally tuned to reset or turn-off an air bypass valve to prevent, for example, large temperature excursions and/or speed droop conditions. In this particular embodiment, the inventive control logic relies secondarily on speed error control. Speed error control is particularly useful when the generator is unloaded in steps, which may not trigger Ndot logic. Of course, the balance between Ndot and speed error control depends on the tuning control parameters. Therefore, control logic using primarily speed error control and secondarily Ndot control are within the scope of the present invention, as well as, control logic that seeks a relatively even balance of Ndot and speed error control.

Figure 4:
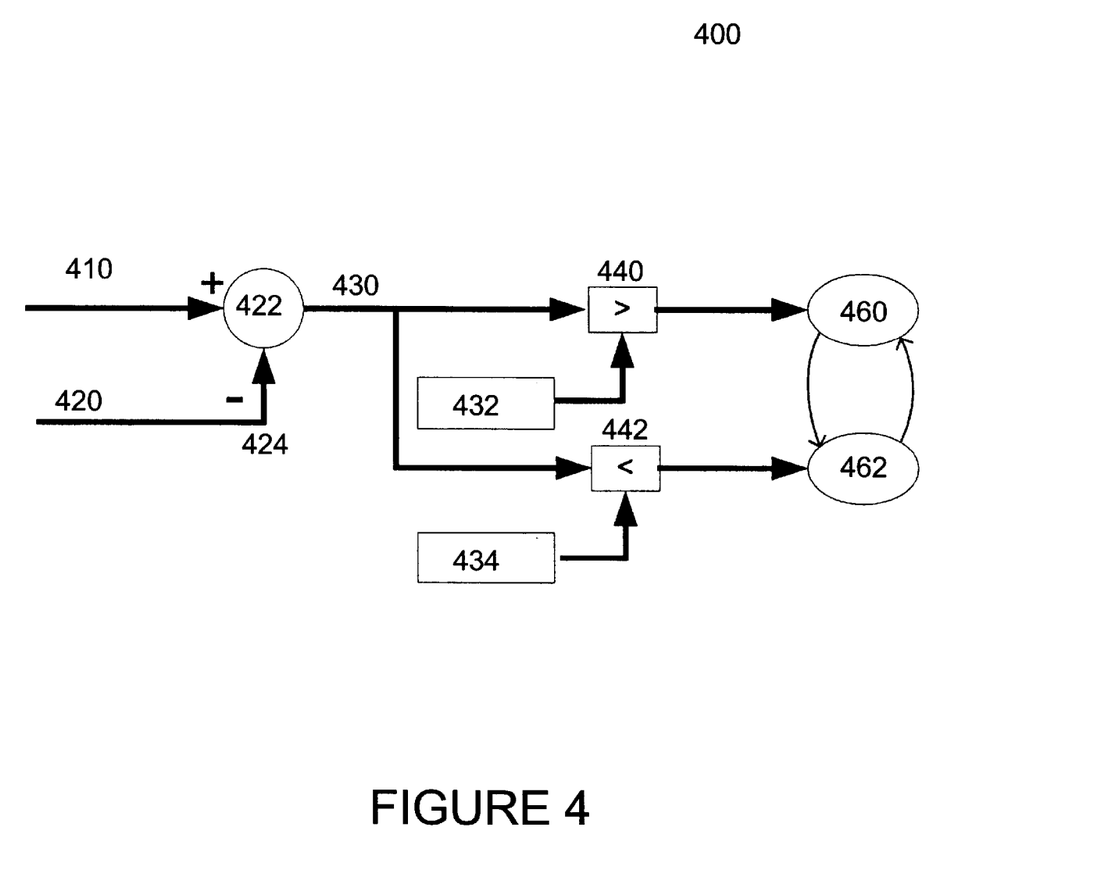
FIG. 4 is a control logic diagram according to an embodiment of the present invention.

Referring to FIG. 4, a control logic diagram for GM operation 400 according to an embodiment of the present invention is shown. In this embodiment, inputs to the logic system comprise variable speed set-point 410 and turbine speed 420. Turbine speed error 430 is determined on the basis of variable speed set-point 410 and turbine speed 420 in a logic block labeled 422. The speed error 430 is then compared to a speed activation value 432, for example, but not limited to, a grid speed delta, in a block labeled 440. The speed activation value comprises a relative value and/or an absolute value, for example, but not limited to, the speed activation value optionally comprises a relative value that is added to another value, which may be variable with respect to time. In this specific embodiment, speed error 430 is also compared to a speed reset value 434, for example, but not limited to, a grid speed delta off, in a logic block labeled 442. The speed reset value comprises a relative value and/or an absolute value, for example, but not limited to, the speed reset value optionally comprises a relative value that is added to another value, which may be variable with respect to time.

As described above and shown in FIG. 4, the inventive control logic comprises data sufficient to activate, for example, but not limited to, a recuperator and turbine bypass valve. Activation occurs when the speed error 430 equals and/or is greater than the speed activation value 432. If activation is warranted, an activation signal is output from the logic block labeled 440. Output from the logic blocks 440 comprises a control signal 460, which is sent, for example, to a recuperator bypass valve. Upon receipt of such a control signal 460, the turbine generator enters, for example, bypass mode. Operation in bypass mode tends to reduce turbine speed and/or overvoltage, in electrical generators.

As described above and shown in FIG. 4, the inventive control logic comprises data sufficient to close or reset, for example, but not limited to, a recuperator and turbine bypass valve. Reset occurs when the speed error 430 equals and/or is less than the speed reset limit 434. If reset is warranted, a reset signal is output from the logic block labeled 442. Output from logic block 442 comprises a control signal 462, which is sent, for example, to a recuperator and turbine bypass valve. Upon receipt of such a control signal 462, the turbine generator enters, for example, normal recuperator mode.

In an embodiment of the present invention, control logic for GM operation comprises variable speed set-reset logic. In this embodiment, the set and reset trip points are above the desired turbine operating speed. Keeping the reset above the turbine operating speed helps to ensure that the speed error will always be negative. A negative speed error helps to keep the fuel flow on the minimum schedule, which prevents large fuel flow and temperature fluctuations and allows the recuperator to cool off in an efficient manner, e.g., in the least amount of time.

According to the present invention, control logic is implemented using analog and/or digital technology known to one of ordinary skill in the art of control systems. Control logic implementation comprising electrical circuit technology is within the scope of the present invention. Electrical circuit technology comprises hardware, which optionally comprises software. According to an embodiment, control logic is programmed into a digital controller. In an embodiment, a digital controller comprises at least one input for inputting information, such as, but not limited to, a turbine speed value, a turbine speed set-point value, a speed activation value, a speed reset value, an Ndot load criterion, and an Ndot unload criterion. In an embodiment, a digital controller also comprises at least one circuit for determining a speed error value from a turbine: speed value and a turbine speed set-point and an Ndot value from a turbine speed value and for comparing a Ndot value to a Ndot load criterion, a Ndot value to a Ndot unload criterion, a speed error value to a speed activation value and a speed error value to a speed reset value wherein at least one circuit outputs a control signal.

Values input into a control logic system of the present invention optionally comprise hardware and/or software input. For example, switches, dials, remote command electromagnetic technologies and/or communication technologies and the like may be used to adjust and/or input values. Software input comprises input from local and/or remote devices.

Industrial Applicability

The invention is further illustrated by the following non-limiting examples.

EXAMPLE 1

Figure 5:
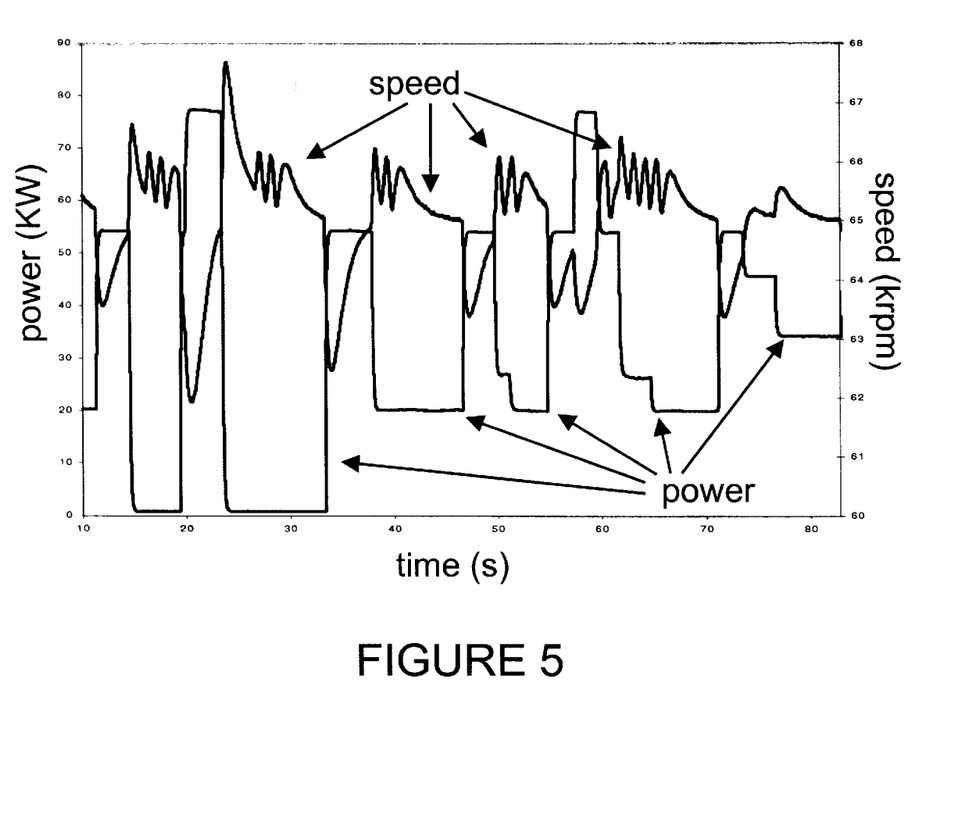
FIG. 5 is a plot of power, or:load, and turbine speed versus time for a recuperated turbine generator comprising control logic of an embodiment of the present invention.

Inventive control logic according to an embodiment of the present invention was used for effective control of turbine speed of a recuperated turbine electrical generator operating in SAM. The turbine generator relied on diesel fuel and air for power generation. Referring to FIG. 5, results are shown for power output and turbine speed versus time. In this particular example, power, or load, was varied from approximately 0 KW to approximately 75 KW. Speed varied, in relation to changes in power, in a range from approximately 62,000 rpm to approximately 68,000 rpm. Note that the power, or load, changes are nearly instantaneous on the time scale shown. Note that step increases in power, or load, resulted in decreases in turbine speed while step decreases in power, or load, resulted in increases in turbine speed. Of particular interest are the results for turbine speed in response to a decrease in power, or load. The following table lists the parameters used in the inventive control logic.

| Parameter | Value |
|---|---|
| Speed Set-Point Value | 65 krpm |
| SAM Speed Activation Value | 2 KRPM |
| SAM Speed Reset Value | 0.5 KRPM |
| Ndot Unload Criterion | 3 KRPM/s |
| Ndot Load Criterion | −2.5 KRPM/s |

Referring to the power, or load, decrease event occurring at approximately 24 seconds, the power was decreased from approximately 75 KW to approximately 0 KW, over a period of approximately 1 second. The turbine speed at the time of the decrease was approximately 64,800 rpm. Nearly instantaneously, the turbine speed rose to approximately 67,800 rpm in response to the decreased load. In response to the decreased load and increased speed, the inventive control logic activated a single recuperator and turbine bypass valve. Activation of this valve caused the turbine generator to enter bypass mode, wherein a portion of the compressor air does not enter the recuperator or turbine. In response to entering bypass mode, the turbine speed decreased from approximately 67,800 rpm to approximately 66,000 rpm in a period of approximately three seconds. Subsequently, the valve was activated three more times before the speed returned to is setpoint and the recuperator cooled off sufficiently.

EXAMPLE 2

Figure 6:
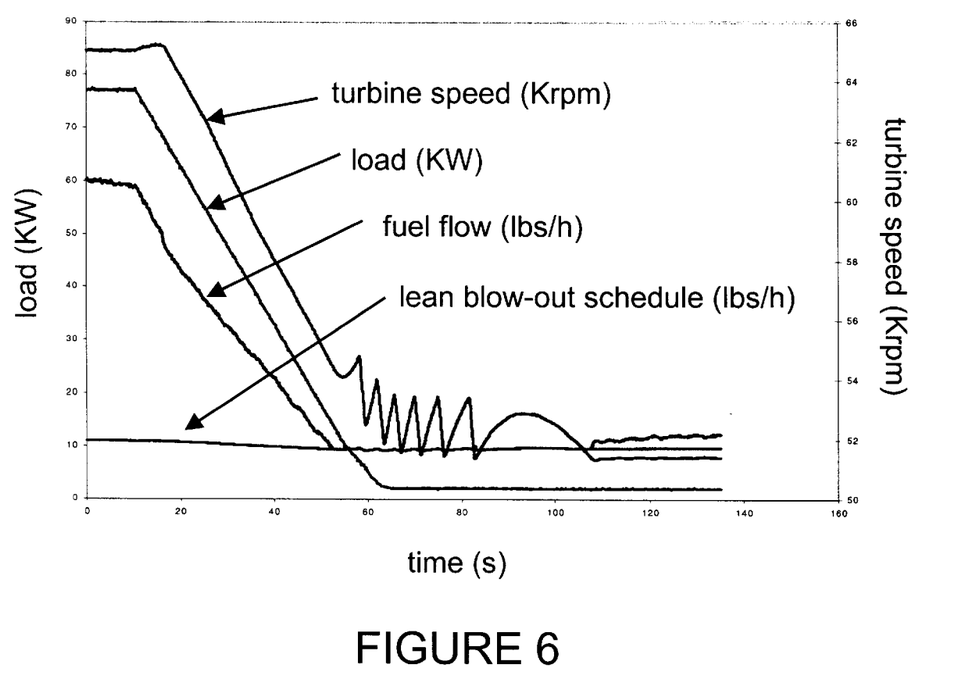
FIG. 6 is a plot of power or load, speed, fuel flow command, and the lean blow-out fuel schedule for a recuperated turbine generator comprising control logic of an embodiment of the present invention.

Inventive control logic according to an embodiment of the present invention was used for effective control of turbine speed of a recuperated turbine electrical generator operating in GM. The turbine generator relied on diesel fuel and air for power generation. Referring to FIG. 6, results are shown for power output (load), turbine speed, fuel flow, and lean blow-out schedule versus time. As shown in the plot, at approximately 0 seconds, the top line is turbine speed (Krpm) (scale on the right), the second line from the top is load (KW), the third line from the top Fuel Flow (lbs/h), and the forth line is lean blow-out schedule (lbs/h).

As shown in FIG. 6, a GM power was decreased from approximately 75 KW to approximately 0 KW over approximately 55 seconds. As the KW load decreased through approximately 15 KW at approximately 50 seconds, the fuel flow command intersected with the blow-out schedule. Shortly after this intersection, the turbine speed began to increase until it reached a speed activation on value, which in this instance comprised a Grid Speed Delta On setpoint (2 Krpm). This event activated a bypass valve according to the control logic of the embodiment shown in FIG. 4. The activation of the bypass valve reduced the turbine speed until it came within a speed reset value, which in this instance comprised a Grid Speed Delta Off setpoint (0.5 Krpm). This action occurred six times, effectively maintaining the speed below approximately 54,000 rpm.

The preceding examples can be repeated with similar success by substituting the generically or specifically described reactants and/or operating conditions of this invention for those used in the preceding examples.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. Control logic for controlling a turbine in response to a change in load comprising at least one input for inputting at least one turbine parameter selected from the group consisting of turbine speed, turbine acceleration, temperature, gas flow, and parameters proportional thereto;

at least one circuit for comparing each selected turbine parameter to at least one turbine control criterion for that parameter wherein the at least one turbine control criterion comprises a member selected from the group consisting of activation criteria and reset criteria; and outputting a valve control signal to a bypass valve in a duct that supplies gas to a recuperator for the turbine, the bypass valve diverting gas flow away from the turbine.

2. The control logic of claim 1 wherein said valve control signal controls a bypass valve that causes bypass of at least 1% of the total gas flow from an air supply compressor to said recuperator.

3. Control logic for controlling a turbine in response to a change in load comprising:

at least one circuit for inputting at least one turbine parameter selected from the group consisting of turbine speed and turbine acceleration;

at least another one circuit for comparing said at least one turbine parameter to at least one turbine control criterion wherein the at least one turbine control criterion comprises a member selected from the group consisting of activation criteria and reset criteria and wherein the at least another one circuit outputs a control signal to a bypass valve in a duct supplying air to a recuperator for the turbine, the bypass valve diverting air flow away from the turbine.

4. The control logic of claim 3, wherein said valve control signal controls a bypass valve that causes bypass of at least 1% of the total gas flow from an air supply compressor to said recuperator.

5. Control logic for controlling a turbine comprising:

at least one input for inputting a turbine speed value, a turbine speed set-point criterion, a speed activation criterion, a speed reset criterion, a turbine acceleration load criterion, and a turbine acceleration unload criterion; and at least one circuit for determining a speed error value from said turbine speed value and said turbine speed set-point and a turbine acceleration value from said turbine speed value and for comparing said turbine acceleration value to said turbine acceleration load criterion, said turbine acceleration value to said turbine acceleration unload criterion, said speed error value to said speed activation criterion and said speed error value to said speed reset criterion wherein said at least one circuit outputs a control signal to a valve that diverts air flow away from said turbine.

6. Control logic for controlling a turbine comprising:

at least one input for inputting a turbine speed value, a turbine speed set-point criterion, a speed activation criterion, a speed reset criterion; and at least one circuit for determining a speed error value from said turbine speed value and said turbine speed set-point and for comparing said speed error value to said speed activation criterion and said speed error value to said speed reset criterion wherein said at least one circuit outputs a control signal to a valve that diverts air flow away from said turbine.

* * * * *